United States Patent [19]

Burley

[11] 4,106,453
[45] Aug. 15, 1978

[54] APPARATUS AND PROCESS FOR IMPROVING FUEL EFFICIENCY OF AN INTERNAL COMBUSTION ENGINE UTILIZING A VAPOR STATE OF FUEL

[76] Inventor: Ernest G. Burley, R.D. 1, Watkins Glen, N.Y. 14891

[21] Appl. No.: 710,374

[22] Filed: Aug. 2, 1976

[51] Int. Cl.² ............................................. F02M 31/00
[52] U.S. Cl. ................ 123/120; 123/122 B; 123/122 C; 48/180 R; 261/41 A; 261/44 B; 261/44 D
[58] Field of Search ................ 48/180 R, 180 C, 184; 123/34 A, 35, 120, 122 B, 122 D, 133, 122 C, 122 E; 261/41 A, 41 B, 44 B, 44 D, 145

[56] References Cited

U.S. PATENT DOCUMENTS

| | | | |
|---|---|---|---|
| 1,190,573 | 7/1916 | Nedoma | 261/44 D |
| 1,196,668 | 8/1916 | Lukacsevics | 261/41 B |
| 1,270,558 | 6/1918 | Scott | 261/44 B |
| 1,942,956 | 1/1934 | De Grey | 48/180 R |
| 2,353,919 | 7/1944 | Morton | 123/120 |
| 2,918,939 | 12/1959 | Holvenstot | 123/120 |
| 3,656,462 | 4/1972 | Bailey | 123/122 D |
| 3,726,512 | 4/1973 | Herwig | 123/122 D |
| 3,765,382 | 10/1973 | Vandenberg | 123/34 A |
| 3,886,919 | 6/1975 | Freeman | 123/122 B |

FOREIGN PATENT DOCUMENTS 818,593  10/1951  Fed. Rep. of Germany ........ 48/180 R Primary Examiner—Ronald H. Lazarus
Attorney, Agent, or Firm—Schovee & Boston

[57] ABSTRACT

An improved fuel/air mixing system is described with reference to a device that includes a mixing cone element in a mixing chamber for creating a zone of turbulence in which pre-heated air is mixed with a regulated admission of fuel vapor.

16 Claims, 8 Drawing Figures

APPARATUS AND PROCESS FOR IMPROVING FUEL EFFICIENCY OF AN INTERNAL COMBUSTION ENGINE UTILIZING A VAPOR STATE OF FUEL

BACKGROUND AND BRIEF DESCRIPTION OF THE INVENTION

The present invention relates to apparatus and a process for improving the fuel efficiency of internal combustion engines. More specifically, the invention is concerned with improved fuel delivery systems for controlling the mix of a vaporized fuel, such as gasoline, with a flow of air so as to produce a high efficiency fuel/air mixture having improved burning characteristics in present day engines which utilize such fuels.

It is known in the art to modify fuel delivery systems for standard internal combustion engines to provide for a vaporization of the fuel and a delivery of fuel vapor to either a standard carburetor or to a single air intake associated with an intake manifold of the engine. Representative patents which disclose such modifications include, for example, U.S. Pat. Nos. 3,286,703; 3,738,334; 3,763,838; 3,800,533; and 3,886,919. As also disclosed in the aforesaid patents, it is known to provide for relatively simple valves and equivalent regulating devices for regulating fuel and/or air delivery to the combustion zone of such modified engines. These prior art efforts have noted, in some cases, that the use of vaporized gasoline in combination with ambient air results in improved burning characteristics of the fuel/air mixture to the extent of providing increased mileage with a given quantity of fuel and a reduction in unwanted emissions from the combustion process.

The present invention shares with the prior art an interest in providing greater efficiencies in fuel consumption and fuel burning characteristics in internal combustion engines which are typically installed in passenger cars and other motor vehicles. The invention also utilizes prior art concepts which suggest a vaporization of fuel prior to mixing with air as a basic approach to optimizing fuel efficiency in a combustion process. However, it is believed that even greater efficiencies can be obtained beyond those suggested by the prior art by following my present teachings which provide for an improved regulation and mixing of fuel vapor with a flow of heated air being drawn into the combustion zone of an internal combustion engine.

In accordance with the basic process of this invention, a liquid fuel, such as gasoline, is vaporized in accordance with known techniques to produce a fuel vapor. Separately, a flow of air is preheated and delivered to a mixing zone where the pre-heated air can be combined with the heated fuel vapor. This process includes a step of diverting the flow of pre-heated air around a mixing cone element so as to create a zone of turbulence downstream from the position of the mixing cone element, and it is in this zone of turbulence that the fuel vapor is introduced into the pre-heated air stream to produce a high efficiency fuel/air mixture. This mixture is then delivered to the combustion zones of an associated engine.

In order to carry out the basic process of this invention, an improved mixing chamber has been devised for regulating the flow of fuel vapor to the mixing zone and for optimizing the introduction of the fuel vapor into a flow of air which is admitted to the mixing zone.

Basic structural features of the improved mixing chamber include a cylindrical housing for defining a mixing zone in its interior. The housing has a major inlet for admitting air to the mixing zone, a plurality of ports for introducing fuel vapor into the mixing zone, and a major outlet for discharging a fuel/air mixture to combustion zones of an associated internal combustion engine. The housing is provided with a regulating assembly fitted therein for relative movement between limit positions which provide for a sequential opening and closing of the plurality of ports formed in the housing. In this manner, a control of the regulating assembly can effect greater or lesser rates of delivery of fuel vapor into the mixing zone, and this control can be carried out with linkage means operatively connected between the regulating assembly and a standard throttle control for the associated internal combustion engine.

The regulating assembly is further designed and constructed to support a mixing cone element in a position which is on a central axis of the mixing chamber (and therefore on a central axis of an air stream moving through the housing) so as to divert an incoming air stream around the mixing cone element in a way that creates a turbulent condition downstream from the position of the mixing cone element. Additionally, means are provided for delivering the fuel vapor to the downstream side of the mixing cone element so that the vapor is, in effect, introduced into a central core region of the turbulent zone which has been created. Farther downstream from the position of the mixing cone element is the major outlet for the housing, and the diameter of this major outlet is somewhat smaller than the diameter of the mixing cone itself so that mixed fuel vapor and air are constricted in their passage from the mixing chamber of the housing to an intake manifold or other plenum associated with an internal combustion engine to which the fuel delivery system is applied.

As a result of the specific improvements of the present invention, I have found that the standard carburetor of an internal combustion engine can be completely eliminated and the improved mixing chamber of my invention substituted therefor. With such a substitution, I have experienced greatly improved fuel consumption characteristics with a standard internal combustion engine in an automobile. The improved fuel consumption characteristics are of such a magnitude it can be theorized that burning efficiencies and completeness of combustion have been greatly improved over any of the suggested arrangements of the prior art known to me.

In a specific application of my invention to an existing engine of the V-block type, I mounted a fuel conduit in heat exchange relationship with an exhaust manifold in one side of the V-block for converting a flow of liquid gasoline into a flow of vapor gasoline. On the opposite side of the V-block engine, I mounted an air conduit in heat exchange relationship with the exhaust manifold on that side to provide for a pre-heating of a flow of air to be supplied to the engine. My improved mixing chamber was mounted so as to receive gasoline vapor from the fuel conduit and the stream of heated air from the air conduit, and my improved regulating assembly was contained within the mixing chamber for regulating the flow of gasoline vapor into the air stream. The regulating assembly included a mixing cone element for creating a zone turbulence into which the gasoline vapor was introduced.

In addition to the basic structural relationships just described, my fuel delivery system also included a needle valve assembly in the conduit which conducted gasoline vapor to the mixing chamber. This needle valve assembly served to provide a separate control of gasoline vapor flow to the mixing chamber and could be used to completely close off the fuel conduit upon shutting down the engine. Although the needle valve could be operated by automatic or semi-automatic means, my own preference was to provide for a manual control of the needle valve assembly from within the driver's compartment of the automobile so that optimum vapor flow rates could be achieved for various running conditions that are experienced with different types of driving or with an engine which is not fully warmed up or one which has been operating for a sustained period of time.

These and other features and advantages of the present invention will become apparent in the more detailed discussions which follow, and in those discussions reference will be made to the accompanying drawings as briefly described below.

DETAILED DESCRIPTION OF THE INVENTION

Figure 1:
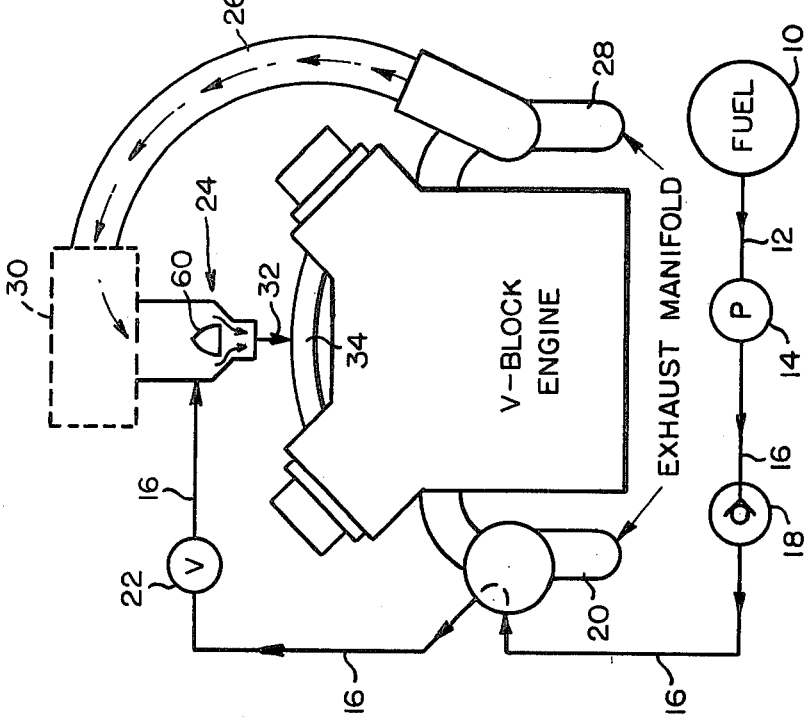
FIG. 1 is a schematic view of an internal combustion engine, as seen in end elevation, with the improved system of the present invention applied thereto as a substitute for a standard carburetor.

Referring to FIG. 1, the invention is illustrated with reference to an embodiment which can be applied to a present day V-block internal combustion engine which burns gasoline as a fuel. As schematically illustrated, fuel in the form of liquid gasoline is drawn from a conventional fuel tank 10 and through a conduit 12 by a conventional fuel pump 14. From this point, an unmodified engine would provide for direct delivery of the liquid fuel to a carburetor for mixing the liquid fuel with an air stream prior to induction into the intake manifolds of the engine. However, in accordance with the present invention the liquid fuel is first delivered through a conduit 16 and a check valve 18, following which the conduit 16 continues to a position where it is mounted in heat exchange relationship with an exhaust manifold 20 on one side of the V-block engine. The heat exchange relationship is such that the liquid fuel is completely vaporized into a hot gasoline vapor which continues to flow through the conduit 16 past a control valve 22, and eventually into an improved mixing chamber assembly 24 (which is substituted for the carburetor of the engine) where the hot fuel vapor is introduced into a central core of a turbulent air flow moving through the mixing chamber 24. On an opposite side of the engine, an air conduit 26 is mounted in heat exchange relationship with an exhaust manifold 28 on that side of the engine, and this provies for a supply of preheated air which can be drawn through a standard air cleaner 30 and into the mixing chamber 24 for mixing with the gasoline vapor which is introduced into the same chamber. An outlet conduit of the mixing chamber 24 provides for a flow of the fuel/air mixture in the intake manifolds or other plenum of the engine. From there the mixture is drawn to separate combustion zones provided by the separate cylinders of the engine.

Thus, FIG. 1 illustrates basic relationships in the system of the present invention as applied to conventional internal combustion engines. Of course, a straight block engine can likewise receive the system of this invention with a single exhaust manifold serving to provide heat for vaporizing the fuel and for pre-heating air to be mixed with the fuel vapor. The mixing chamber 24 constitutes an important part of the overall system since it can be substituted for a conventional carburetor, and yet, provides a superior means for mixing fuel vapor with heated air. Details of the mixing chamber 24 are discussed below with reference to FIGS. 2–5.

Figure 2:
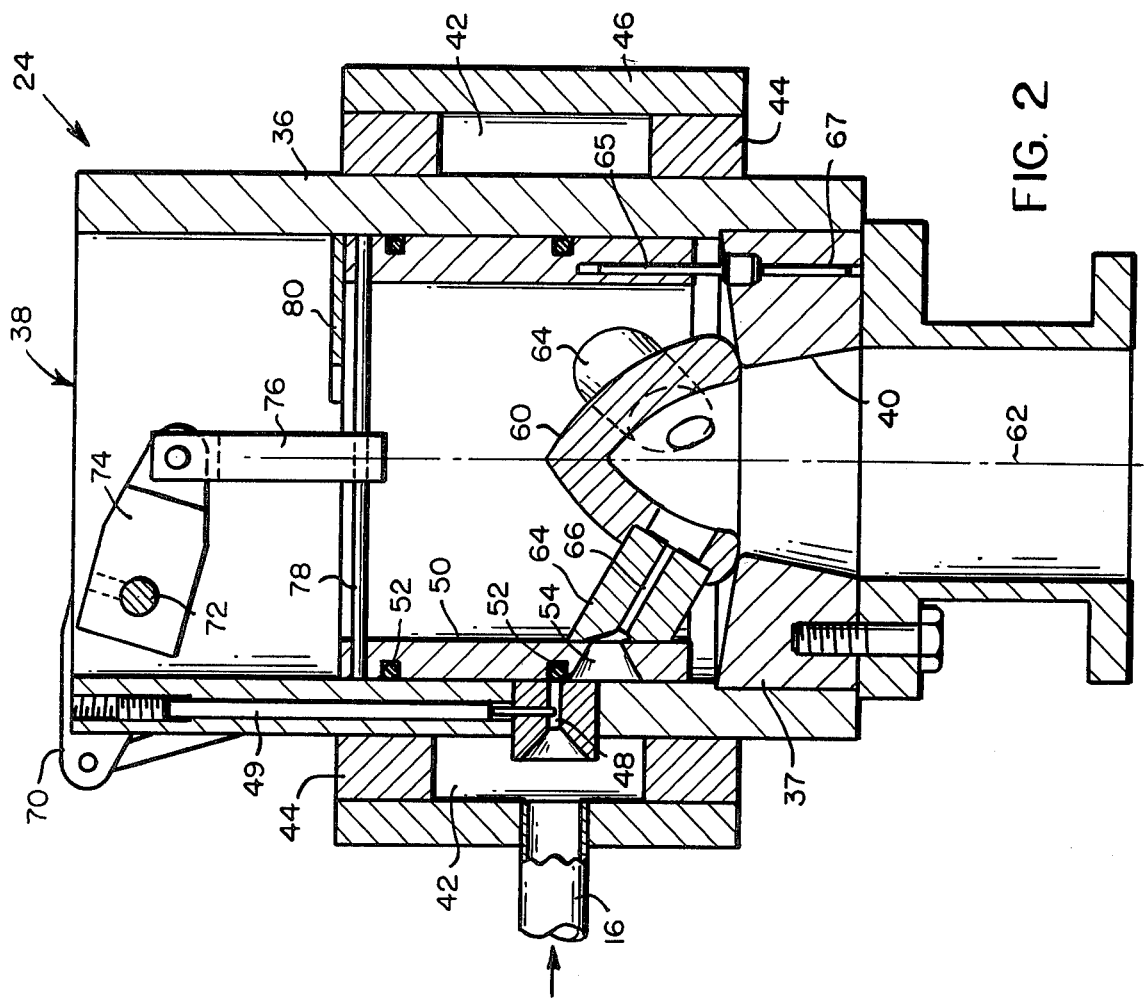
FIG. 2 is an elevational, cross-sectional view, in enlarged scale over that shown in FIG. 1, of an improved mixing chamber for the system of the present invention.

FIG. 2 shows a cross sectional view, in elevation, of a mixing chamber 24 assembled in accordance with the teachings of this invention. The basic function of the mixing chamber 24 is to establish a mixing zone in which fuel vapor can be introduced into a turbulent flow of pre-heated air. An additional function of the mixing chamber 24 is to provide for a regulation of delivery rate of fuel vapor to the mixing zone which is established, and in the preferred embodiment which is illustrated, the mixing chamber provides for an introduction of the regulated flow of fuel vapor into a central core section of a turbulent air flow which has been created therein.

The illustrated embodiment of a mixing chamber 24 includes a first cylindrical member 36 for defining a housing through which a regulated flow of vapor fuel can be mixed with a turbulent flow of air to produce a high efficiency fuel/air mixture. The housing has a major inlet 38 for admitting air to the mixing zone defined therein, together with a major outlet 40 for discharging a fuel/air mixture to combustion zones of an associated internal combustion engine. Fuel is delivered to the housing through the conduit 16 into an annular reservoir 42 defined by the spaced-apart rings 44 and sleeve 46, all of which are secured to the outer wall of the cylindrical member 36 making up the housing. The fuel vapor is admitted into the housing through one or more of a plurality of ports 48 (only one being illustrated in the FIG. 2 drawing) which are positioned at slightly different vertical levels (as viewed in the orientation of FIG. 2) so as to provide for a "staging" effect as the separate ports are sequentially opened and closed during a regulation of vapor flow into the housing. A regulating assembly for controlling the opening and closing of ports 48 in the housing is provided by an inner cylindrical member 50 which is snugly fitted within the bore of the outer cylindrical member 36. Suitable O-rings 52, or equivalent sealing devices, are fitted in annular grooves to seal the inner cylindrical member 50 within the housing while permitting axial movement of the inner cylindrical member 50 relative to the outer cylindrical memer 36. The inner cylindrical member 50 is provided with three fuel-admitting openings 54 which correspond in number to the number of ports 48 provided in the outer cylindrical member 36. The fuel-admitting openings 54 are positioned at a common vertical level around the cylindrical member 50 and in circumferential positions which allow each of the openings 54 to move into and out of alignment with one of the ports 48 as the cylindrical member 50 is moved axially up and down (in the FIG. 2 orientation) relative to the housing of the mixing chamber 24. As will be discussed in greater detail later, the fuel-admitting openings 54 are of such a diameter that they can collectively span the positions of more than one of the fuel ports 48. Thus, as the cylndrical member 50 moves in an upward direction, the plurality of ports 48 can be sequentially opened until all such ports are in open communication with the mixing zone contained within the interior of the mixing chamber 24.

Although it would be possible to merely open and close the ports 48 by the action of the inner cylindrical member 50 relative to the outer fixed cylindrical member 36, to thereby control passage of fuel vapor into the inner bore of the mixing chamber, I have found that unusually good results are obtained if the regulating assembly is further provided with a mixing cone 60 together with means for carrying the introduced fuel all the way to a central axis 62 of the bore prior to actual mixing of the fuel with the flow of heated air which is passing through the mixing chamber 24 from the top to the bottom thereof. As shown in FIG. 2, the mixing cone 60 is positioned on the central axis 62 of the mixing chamber so as to cause a diverting of the flow of preheated air around the entire circumference of the mixing cone element (in this connection, FIG. 2 shows the mixing cone element 60 in a lowermost limit position in which no fuel is being admitted into the mixing chamber, and the mixing cone element must be raised from this position whenever the engine is started and fuel and air are to be mixed) to thereby produce a zone of turbulence below (downstream of) the mixing cone element. The shape of the mixing cone element is such that a convex face is provided on an upstream side thereof to produce a smooth flow of air all through the mixing cone element. A generally concave face is provided on a downstream side thereof so as to establish a site into which fuel vapor can be delivered to the central axis 62 of the mixing chamber 24 prior to being mixed with the heated air stream flowing through the chamber. Positioning of the mixing cone element 60 is accomplished by mounting the mixing cone element with strut elements 64 having passageways 66 formed therethrough to communicate with each of the fuel-admitting openings 54 of the inner cylindrical member 50. The mixing cone element 60, the struts 64, and the inner cylindrical member 50 are all soldered or otherwise secured together to form an integral structure which can be moved up and down with throttle control linkages to thereby regulate the flow of fuel vapor into the downstream zone of turbulence which is formed below the mixing cone element 60. Preferably, the outlet 40 of the mixing chamber 24 is of a smaller diameter than the diameter of the mixing cone itself so as to cause a constriction and further mixing of the fuel/air mixture as it is drawn into the intake manifold of the engine.

Figure 3:
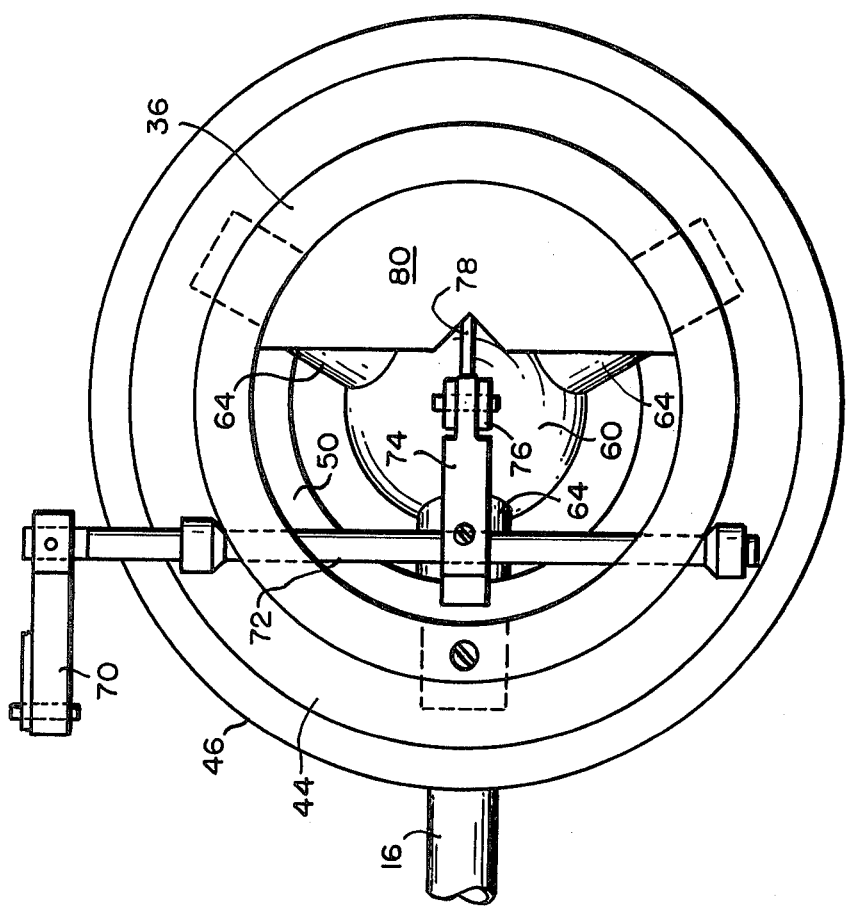
FIG. 3 is a top plan view of the mixing chamber shown in FIG. 2 and drawn in the same scale as FIG. 2.

As shown in FIGS. 2 and 3 linkage means are provided for operatively connecting the regulating assembly of the mixing chamber 24 with a standard throttle control (not shown) for the internal combustion engine with which the mixing chamber is associated. The linkage means includes a control lever 70 fastened to an outer end of shaft 72 for rocking the shaft. Shaft 72, in turn, lifts and lowers another lever 74 secured at an intermediate position on the shaft 72. The lever 74 is pinned to a lifting bar 76 connected to a cross rod 78 secured at its opposite ends to the inner cylinder 50. Thus, as the throttle linkage of the engine is actuated to increase engine speed, the lever 74 is lifted so as to lift the inner cylindrical member 50 and its associated structures, thereby causing the fuel-admitting openings 54 of the regulating assembly to become sequentially aligned with the ports 48 formed through and around the housing of the mixing chamber 24. Also shown in FIG. 3 is the position of a baffle plate 80 secured to the top of the inner cylinder 50 to restrict air flow into the mixing chamber and to provide initial turbulence in the air stream which is entering the mixing chamber upstream of the position of the mixing cone 60.

Figure 4:
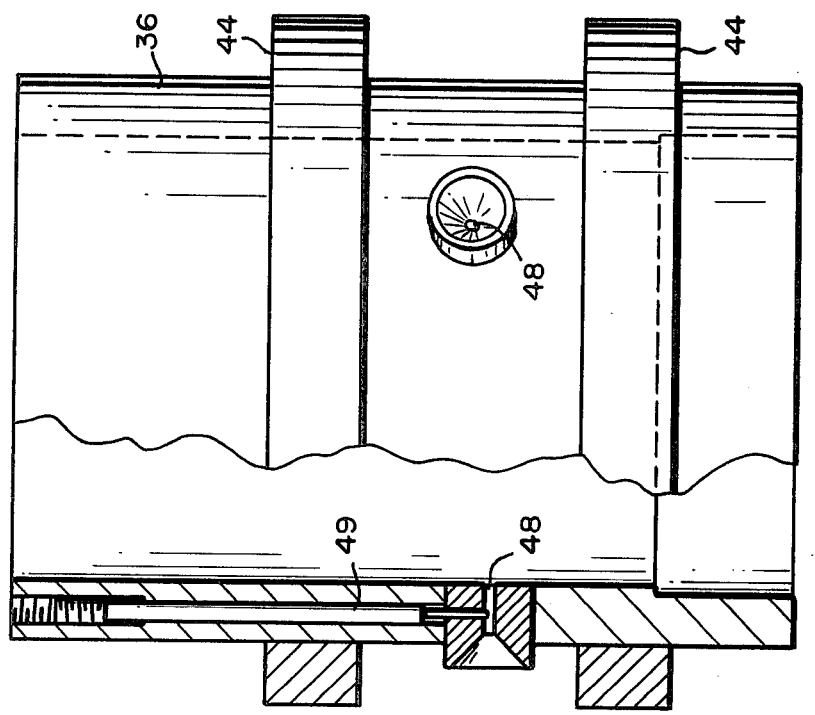
FIG. 4 is an elevational view, in the same scale as in FIG. 3, of an outer cylindrical member which defines a housing for the mixing chamber of this invention.
Figure 5:
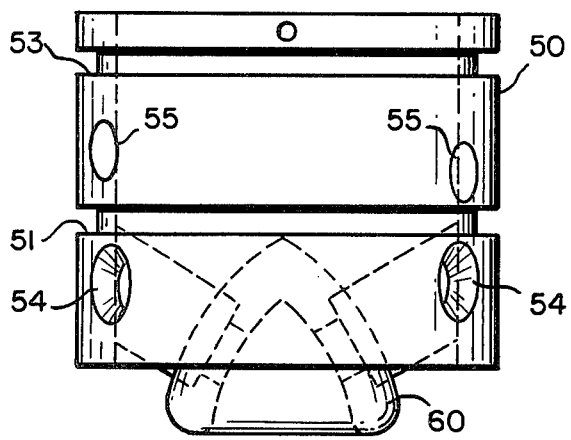
FIG. 5 is an elevational view, in the same scale as FIG. 4 of an inner cylindrical member and associated structures for being fitted within the housing shown in FIG. 4.
Figure 6:
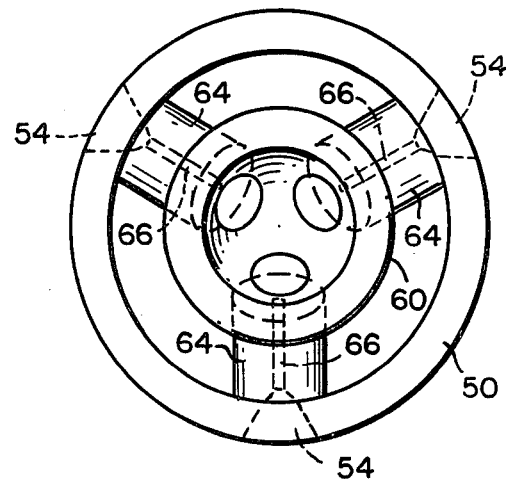
FIG. 6 is a bottom view of the structures shown in FIG. 5.

FIGS. 4–6 illustrate additional details of the inner and outer cylindrical members which are fitted together to regulate the flow of fuel vapor into the mixing chamber 24. As previously indicated, the outer cylindrical member 36 is provided with a plurality of ports 48 for admitting fuel vapor from the reservoir 42 into the interior of the mixing chamber 24. In the FIG. 4 view, two such ports 48 can be seen, but three of these ports are provided and are spaced 120° from one another around the circumference of the cylindrical member 36 which makes up the housing of the mixing chamber 24. The three ports vary in size and position so as to provide a lowermost position which serves as an idling port and is the only port in open communication with the interior of the mixing chamber when the engine is set for a idle state. This port may be provided with a bore diameter of 0.050 inches, for example, while the remaining two ports are provided with substantially smaller diameter bores for admitting additional volumes of fuel as the engine is accelerated to a faster running condition. For example, the second and third ports (located at intermediate and uppermost positions) may be provided with bores of 0.0180 inches. In the case of the idling port (lowermost position, on the left in the FIG. 4 view), it is desirable to provide for an adjustment of the bore opening with an idling screw 49 threaded into a bore formed lengthwise through the wall of the cylindrical member 36 to a point that intersects with the bore of the idling port. The idling screw is accessible from the top end of the cylindrical member 36. For convenience of manufacture, all of the ports 48 can be assembled from plug elements which have been carefully bored to the required dimensions, and the plug elements are then press-fitted into corresponding openings which have been formed through the cylindrical member 36.

As shown in FIGS. 5 and 6, there are three fuel-admitting openings 54 provided in the inner cylindrical member 50 for alignment with the three ports 48 which have been just discussed with reference to FIG. 4. The three fuel-admitting openings 54 are at a common level and are spaced 120° from each other around the circumference of the cylindrical member 50 so they can be aligned with respective ones of the ports 48 with which they are associated when the two cylindrical members are assembled. Although the final fuel delivery bores 66 (formed through the strut elements 64) must be formed with a high degree of precision relative to the bore diameters of the individual ports 48, the fuel-admitting openings 54 comprise relatively major openings which are counter sunk into the cylindrical member 50 so as to provide fuel-admitting openings that can receive fuel over a range of positions of the cylindrical member 50 relative to the outer cylndrical member 36. Thus, each of the fuel-admitting openings 54 may have a diameter of approximately 0.5000 inches at the surface where the inner cylindrical member 50 contacts the outer cylindrical member 36. This means that if the three ports 48 are positioned at vertical levels within ½ inch of each other, it is possible to raise the inner cylindrical member 50 to a series of positions that will open one, two, and then all three of the ports 48 into communication with the relatively large fuel-admitting openings 54 for delivering fuel to the interior of the mixing cone element 60. As previously stated, the bores 66 through which the fuel vapor is ultimately delivered to the mixing zone should be related to the desired functions of the several inlet ports. In this regard, the bore 66 which receives fuel from the lowermost idling port 48 may be of a diameter of 0.047 inches. The bore 66 which receives fuel from the intermediate level port 48 may be of a diameter of 0.031 inches, and the bore 66 which receives fuel vapor from the uppermost port 48 may be of a diameter of 0.018 inches. In this way more and more fuel can be admitted to the mixing chamber as the mixing assembly is lifted from its lowermost position to its uppermost limit position within the mixing chamber 24. Of course, greater or lesser numbers of ports 48 and fuel-admitting openings 54 may be provided in the two cylindrical members 36 and 50.

Figure 7:
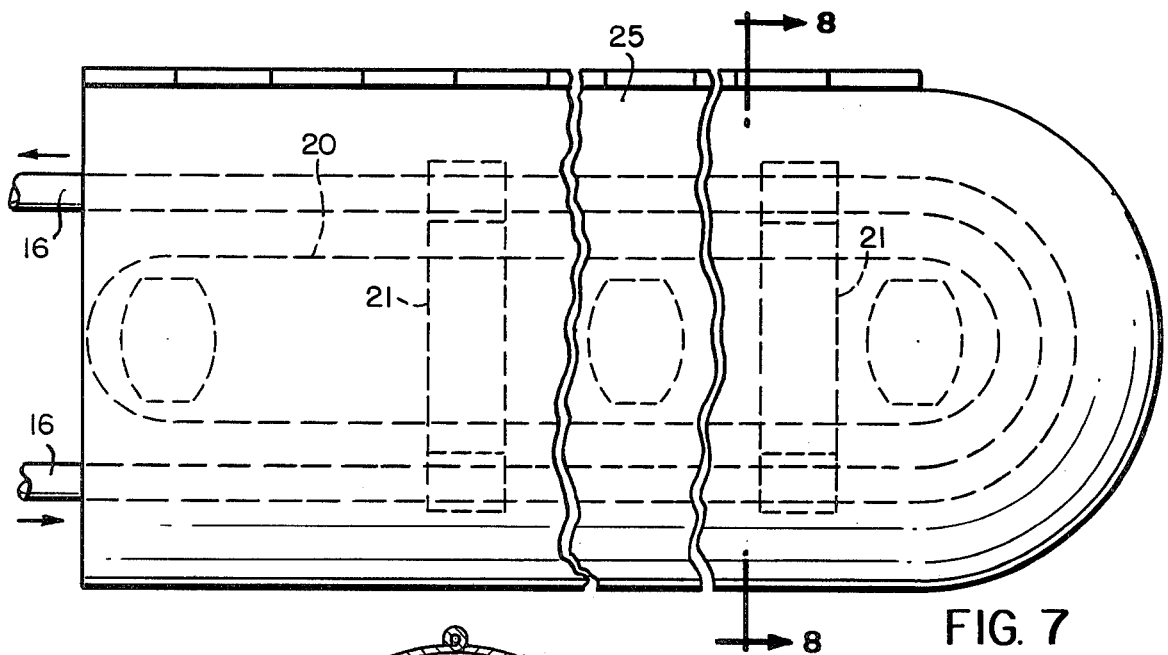
FIG. 7 is a side elevational view of a heat exchanger assembly for vaporizing liquid fuel into vapor fuel.
Figure 8:
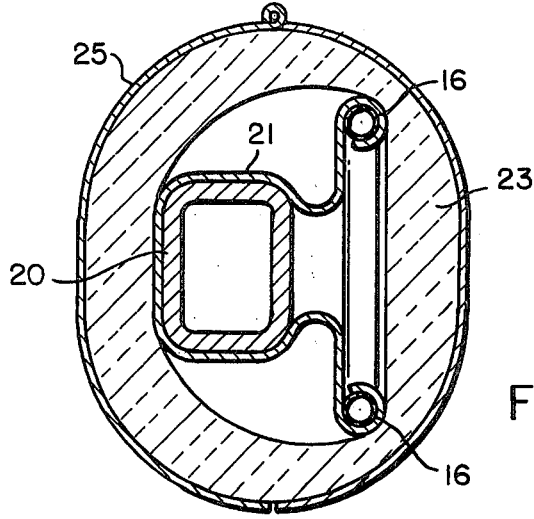
FIG. 8 is an end elevational view, in cross-section, of the heat exchanger assembly shown in FIG. 7, as seen on line 8—8 thereof.

FIGS. 7 and 8 illustrate details of a heat exchanger assembly which can be installed around a portion of the fuel conduit 16 and an exhaust manifold 20 of an internal combustion engine. As previously explained with reference to FIG. 1, fuel is pumped through the conduit 16 in a liquid form until it reaches the point where the fuel conduit 16 is placed in a heat exchange position relative to an exhaust manifold of the engine to which the system is applied. As shown in FIG. 7, the fuel conduit 16 can be shaped to extend along the lower side of the exhaust manifold 20, around its forward end, and back along an upper side of the exhaust manifold 20. The fuel conduit 16 is positioned and held in place by two brackets 21 which are fitted around the exhaust manifold 20 and which are formed to enclose a section of the fuel conduit 16. The brackets 21 serve to keep the fuel conduit out of actual contact with the exhaust manifold, but serve to maintain proper positioning of the conduit for receiving sufficient heat from the manifold to vaporize liquid fuel contained therein. As shown in FIG. 8, insulation in the form of asbestos tape 23 can be wrapped around the exhaust manifold 20 and the mounted fuel conduit 16 to retain as much heat as possible adjacent to the fuel conduit 16. A shield 25 is then formed and placed around the entire assembly.

The system described above can be manufactured and assembled from known components and materials as would be selected by persons skilled in this art to manufacture equipment of this type. Choices of materials and components must take into consideration the relatively high pressures that are created when gasoline liquid is converted to gasoline vapor, and thus, for example, the fuel conduit 16 and the control valve 22 must be designed for relatively high fluid pressure operation (up to 10,000 psi) on the downstream side of the exhaust manifold 20. In addition, the fuel conduit 16 can be insulated for its entire length on the downstream side of the exhaust manifold 20 to maintain the vapor in a hot conditon which will not recondense prior to introduction into the mixing chamber 24.

Having described the basic structural and functional relationships of a system of the claimed invention, it can be appreciated that equivalent structures can be substituted for those which have been described above. However, to assist persons working in this art to manufacture an actual unit of this design, I submit the following example as a specific embodiment which has been actually manufactured and tested successfully. In this specific embodiment, the inner cylindrical member 50 (see FIGS. 5 and 6) was manufactured with an outside diameter of 2¾ inches, an internal diameter of 2¼ inches and a height of 2¼ inches. Other inside and outside diameters and height will suffice as long as the proportions are kept near to these. The fuel-admitting openings 54 were formed by drilling bores on centers 17/32 inches from the bottom, 120° apart and ¼ inch in diameter. These bores were then countersunk to ½ inch diameter to provide the desired diameter of fuel-admitting openings on the outside surface of the cylindrical member 50. Directly above the three fuel-admitting openings 54 I formed an angular groove 51 for receiving the lowermost O-ring 52. A second annular groove 53 was formed at a centered distance of 1 1/32 inch distance from the annular groove 51. In addition two longitudinal slots 55 were formed into the surface of the cylindrical member 50 for receiving short lengths of O-ring material, or similar sealing material for closing and sealing uppermost ports 48 in the cylindrical member 36 (see FIG. 4 and discussion relating thereto), to thereby provide a tight seal of those ports when the cylindrical member 50 is in a lowered position for admitting fuel only through the lowermost idler port 48. Referring back to FIG. 2, there is shown a guide pin 65 fitted within the lower end of cylindrical member 50, and extending downwardly therefrom to be received in a guide bore 67 formed in the fixed structures associated with the outer cylindrical member 36. Two such guide pins were provided so as to maintain the inner cylindrical member 50 in correct alignment relative to the outer cylindrical member 36 for all of its positions of axial movement.

The mixing cone element 60 is formed, in this specific embodiment, in the general shape shown in FIGS. 2 and 5. This mixing cone element 60 was 1½ inches in diameter and 1 3/16 inches in height. The struts 64 were cut from ⅝ inch diameter rod in lengths of approximately 13/16 inches each. Bores 66 were drilled into the rods as previously described, and the three rods were silver soldered into counterbore openings formed 120° apart around the main body of the mixing cone element 60.

The outer cylindrical member 36 was formed with a 3½ inch outside diameter, a 63 microinch finished inside diameter of 2.7535 inches and a height of 5 inches. A lower end of the cylindrical member 36 was counterbored to provide for a securement of a bottom ring member 37 for defining the outlet opening 40 for the mixing chamber 24. A reservoir 42 was formed with a sleeve member 46 having an inside diameter of 4.3755 inches, an outside diameter of 4⅝ inches and a height of 2⅝ inches.

Of course, there are many other specific details of manufacture which could be mentioned in a specific example of the type being described here, but the remaining details are of a type within the skill of a mechanic and are not critical to the successful practice of this invention. Therefore, details of this type are being omitted from this discussion for purposes of clarity in understanding the basic invention.

In using the system of the present invention, the engine is started in the usual way with an ignition key but includes an additional step of actuating the control valve 22 (see FIG. 1) to a start position. In the case of a manually operated control valve 22, the valve can be rotated counterclockwise (using a standard needle valve assembly for opening and closing the conduit 16 into which it is inserted) approximately 45° from its initial closed position. During the initial start, liquid fuel is pumped through the first check valve 18 (see FIG. 1) set to operate on a pressure differential of 2 psi. From there the fuel is pumped to the heat exchanger assembly associated with the exhaust manifold 20. A pressure reducing valve and another check valve may be provided upstream from the heat exchanger assembly, if needed. Initially liquid gasoline is pumped all the way to the mixing chamber 24 until the engine has warmed up enough to convert liquid gasoline into a vapor. In addition, as the engine warms up air is pre-heated in the conduit 26 until the pre-heated air reaches a temperature of approximately 172° F at the point where it is admitted to the mixing chamber 24. Once the engine starts operating on vapor and is fully warmed up, the control valve 22 is adjusted to restrict the flow of vapor from its initial flow rate. This can be done manually by rotating the needle valve clockwise back to a position approximately 15° from its fully closed position. When the vehicle is shut down the control valve 22 is closed completely to stop the flow of vapor, and the ignition is turned off in the usual manner.

The invention has been described in detail with particular reference to the preferred embodiments thereof, but it will be understood that variations and modifications can be effected within the spirit and scope of the invention as described hereinabove and as defined in the appended claims.

What is claimed is:

1. In an internal combustion engine of the type which includes (a) heating means for converting liquid fuel into vapor fuel and (b) a mixing chamber for combining a regulated fuel of the vapor fuel with a flow of air, the improvement in said mixing chamber comprising
    a housing defining a mixing zone through which a regulated flow of vapor fuel is mixed with a turbulent flow of air to produce a high efficiency fuel/air mixture, said housing having
        a major inlet for admitting air to said mixing zone,
        a plurality of ports for introducing fuel vapor into said mixing zone, and
        a major outlet for discharging the fuel/air mixture to combustion zones of an associated internal combustion engine,
    a regulating assembly contained within said housing for controlling the rate of flow of fuel vapor into the housing, said regulating assembly being fitted within said housing for relative movement thereto and for sequentially opening and closing said plurality of ports as said regulating assembly is moved between limit positions within the housing, and
    linkage means operatively connected between said regulating assembly and a standard throttle control for said internal combustion engine so that operation of said throttle control will effect movement of said regulating assembly to thereby control the rate of flow of fuel vapor to the engine, wherein said plurality of ports are formed through portions of said cylindrical member intermediate its ends and at varying distances from its ends, and including a reservoir structure around said housing and in communication with said plurality of ports for containing a volume of fuel vapor for introduction into said housing, and
    wherein said regulating assembly comprises a second cylindrical member fitted within the bore of said first cylindrical member for axial movement therein, said second cylindrical member having a number of openings formed therein which are equal in number to the number of said plurality of ports formed in the first cylindrical member, said openings being positioned and arranged to become sequentially aligned or misaligned with said ports in accordance with the axial positioning of said second cylindrical member within the first cylindrical member, said second cylindrical member being further provided with a longitudinal bore therethrough for admitting a flow of air through the regulating assembly.

2. The improvement of claim 1 wherein said second cylindrical member is provided with a mixing cone mounted within its bore, said mixing cone being smaller in diameter than the diameter of the bore in which it is mounted so that a flow of air can move past the position of the mixing cone for combining with said vapor fuel downstream from the position of the mixing cone.

3. The improvement of claim 2 wherein said mixing cone is mounted with strut elements which fix the position of the mixing cone on a center axis of said second cylindrical member, said strut elements having bores therethrough for communication with the openings formed through the second cylindrical member to thereby provide flow paths for said vapor fuel to a zone which is near the center axis of the regulating assembly and at a downstream end of the mixing cone.

4. The improvement of claim 1 and including valve means in a conduit which carries fuel vapor to said mixing chamber, said valve means being controllable to vary the flow rate of vapor to said mixing chamber independently of the throttle control setting for said regulating assembly.

5. The improvement of claim 1 and including means for pre-heating air admitted to said mixing chamber.

6. The improvement of claim 1 and including a baffle means in said major inlet of said mixing zone to create turbulence in an air flow as it is admitted into the mixing zone.

7. In an internal combustion engine of the type which utilized a heated fuel/air mixture and which includes:
    (a) a mixing chamber for combining a regulated flow of heated vapor fuel vaporized from a supply of liquid fuel and mixed with a flow of heated air to form a heated fuel/air mixture,
    (b) a fuel supply heating means for heating and vaporizing said liquid fuel, said fuel heating means being associated with fuel conduit means leading from a supply of liquid fuel to said mixing chamber,
    (c) pumping means associated with said fuel conduit means for conveying said liquid fuel from said supply of fuel through said fuel conduit means to said heating means,
    (d) back-pressure control means associated with said pump in said fuel conduit means, (e) valve control means in said fuel conduit means in that portion of the conduit means which carries heated vapor fuel to said mixing chamber, (f) an air supply means for supplying air to an air heating means, said heating means being associated with air conduit means leading from said air supply means to said heating means and with heated air conduit means leading from said heating means to said mixing chamber, said mixing chamber comprising:

(i) a cylindrical housing having a longitudinal bore extending therethrough defining open inlet and outlet ends at opposite ends thereof and with a mixing zone defined in between the major inlet and major outlet, in which mixing zone a regulated flow of said heated vapor fuel is mixed with a flow of said heated air to form a heated fuel/air mixture said housing including:

(aa) a plurality of major fuel inlets for admitting said heated vapor fuel to heated vapor fuel conduit means associated with said inlets and passing through outer and inner walls of said housing, (bb) a plurality of major fuel outlets leading from said heated fuel conduit means to said mixing zone for delivering said heated vapor fuel thereto, (cc) at least one major air inlet at said inlet ends of the housing for receiving heated air from said heated air conduit means and for admitting said heated air into said bore of said housing leading to the mixing zone thereof, (dd) heated fuel/air mixture conduit means leading from said outlet end of said housing to combustion zones of an associated internal combustion engine, and (ii) a regulating assembly associated with said housing for controlling the rate of flow of said heated vapor fuel to said mixing zone, the improvement in said mixing chamber wherein:

a. said plurality of heated vapor fuel inlets, conduits and outlets form a plurality of fuel ports in said housing intermediate its ends and varying distances from its ends, b. said regulating assembly comprises:

an axially movable cylindrical member fitted within the bore of said housing for regulated axial movement therein with its outer wall engaging the inner wall of the first member with gas sealing means, said movable cylindrical member having a number of openings formed therein which are equal in number to the number of said plurality of ports formed in the housing, said openings being positioned and arranged to become sequentially aligned or misaligned with said ports in accordance with the axial positioning of said movable cylindrical member within the housing, upon axial movement of said member relative to said housing during operation of said regulating assembly between limit means associated within said housing, and said movable cylindrical member being further provided with a longitudinal bore therethrough for passing a flow of said heated air through said member to the mixing zone of said housing, and c. linkage means operatively connected between said regulating assembly and a standard throttle control for said internal combustion engine so that operation of said throttle control will effect movement of said regulating assembly to thereby control the rate of flow of heated vapor fuel to the mixing zone of said mixing chamber and of heated fuel/air mixture to the engine.

8. The improvement of claim 7 wherein said openings in said axially movable cylindrical member are positiond at a common vertical level around the member and in circumferential positions which allow each of the openings to move into and out of alignment with one of said ports in said housing as the movable cylindrical member is moved axially up and down relative to the housing of said mixing chamber.

9. The improvement of claim 8 wherein (i) the heated vapor fuel ports in the housing are of different diameters relative to each other, (ii) the heated vapor fuel openings in the movable cylindrical housing are of the same diameters relative to each other, and (iii) the fuel-admitting inlets of said openings are of such a diameter that they can collectively span the positions of more than one of said ports.

10. The improvement of claim 7 wherein said valve means are controllable to vary the flow rate of heated fuel vapor to said mixing chamber independently of the throttle control setting for said regulating assembly.

11. The improvement of claim 7 and including a baffle means in said major air inlet of said inlet end of said housing to create turbulence in flow of heated air as it is admitted into the mixing zone.

12. The improvement of claim 7 and including a reservoir structure around said housing and in communication with said plurality of ports for containing a volume of heated fuel vapor for introduction into said housing.

13. The improvement of claim 12 wherein said movable cylindrical member is provided with a mixing cone mounted within its bore, said mixing cone being smaller in diameter than the diameter of the bore in which it is mounted so that a flow of heated air can move past the position of the mixing cone for combining with said vapor fuel downstream from the position of the mixing cone.

14. The improvement of claim 12 wherein said movable cylindrical member is provided with a mixing cone mounted within its bore, said mixing cone being smaller in diameter than the diameter of the bore in which it is mounted so that a flow of heated air can move past the position of the mixing cone for combining with said vapor fuel downstream from the position of the mixing cone.

15. The improvement of claim 14 wherein said mixing cone is mounted with strut elements which fix the position of the mixing cone on a center axis of said housing, said strut elements having bores therethrough for communication with the openings formed through the movable cylindrical member to thereby provide flow paths for said heated vapor fuel to a zone which is near the center axis of the regulating assembly and at a downstream end of the mixing cone.

16. The improvement of claim 15 wherein (i) the heated vapor fuel ports in the housing are of different diameters relative to each other, (ii) the heated vapor fuel openings in the movable cylindrical housing are of the same diameter relative to each other, (iii) the fuel-admitting inlets of said openings are of such a diameter that they can collectively span the positions of more than one of said ports, (iv) the bores of said strut elements are of different diameters relative to each other, and (v) said openings are positioned at a common vertical level around the movable cylindrical member and in circumferential positions which allow each of the openings to move into and out of alignment with one of said ports as the movable cylindrical member is moved axially up and down relative to the housing of said mixing chamber.

* * * * *